United States Patent Office 2,797,772
Patented July 2, 1957

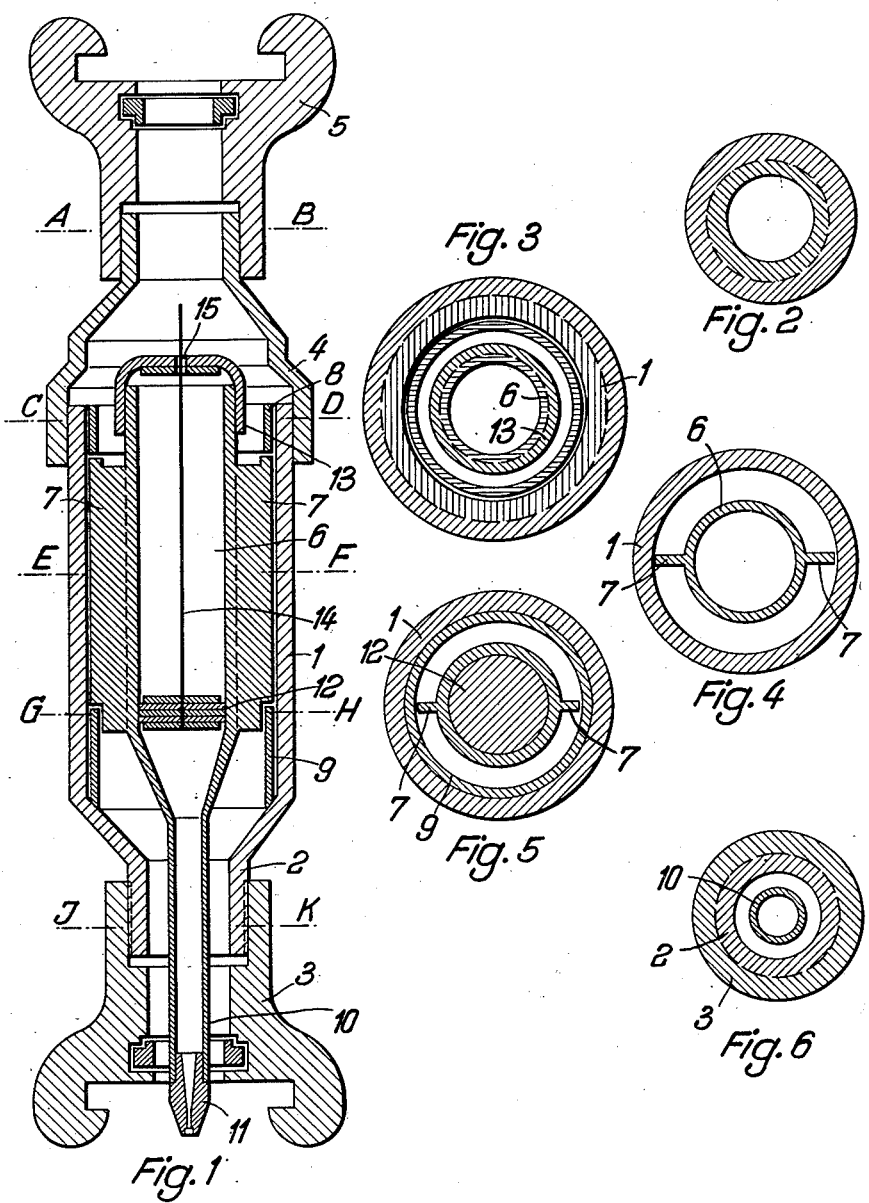

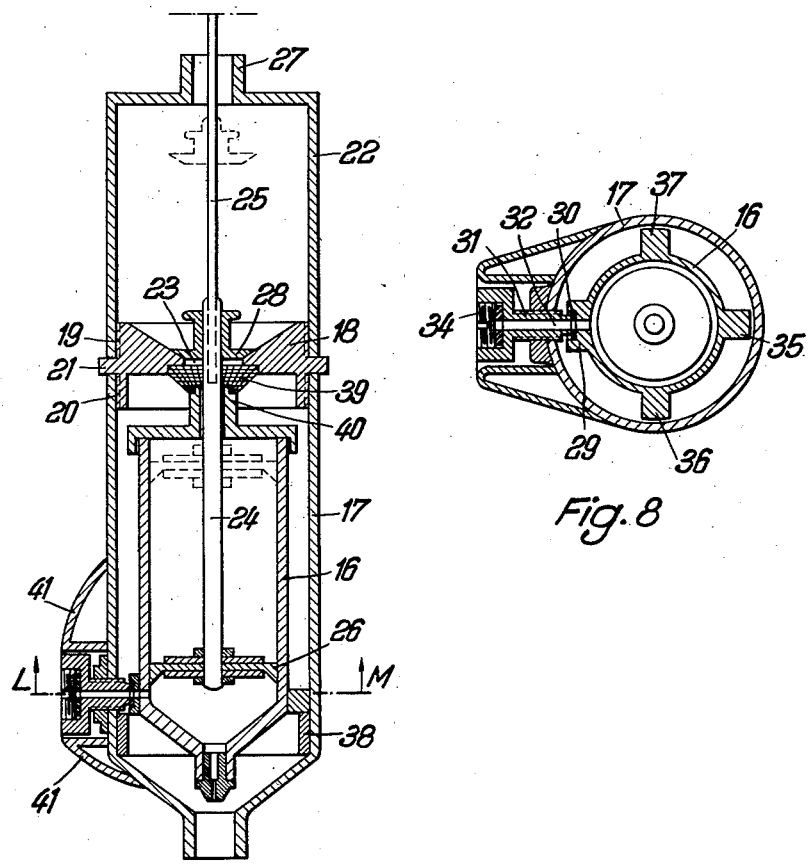

2,797,772

APPARATUS FOR THE LUBRICATION OF MACHINES AND SIMILAR EQUIPMENT

Paul Beckmann, Dortmund, Germany

Application May 2, 1956, Serial No. 582,183

Claims priority, application Germany May 7, 1955

3 Claims. (Cl. 184—39)

The invention relates to an apparatus for the lubrication of machines and other equipment driven by compressed air, such as, for example, rope winches, elevators, coal-hewing arrangements or riveting hammers. For the lubrication of this type of machines and other compressed air equipment it has been proposed to provide among other arrangements, oil capsules, whose contents were expected to last for a predetermined time, and accordingly had to be applied to the lubrication points by the servicing personnel at relatively short time intervals. Consequently this extremely important service was entirely in the hands of the servicing personnel who were not always responsible persons, so that frequently the supply was not replenished at the correct time, quite apart from the fact that an uncontrollable quantity of the lubricant disappeared ineffectively. The inevitable result was that the relatively moving parts of the machine or other equipment became hot and seized up.

The object of the present invention is to eliminate these drawbacks.

According to the present invention, an apparatus for the lubrication of machines or other equipment driven by compressed air comprises a hollow member narrowing at one end and built into the compressed air conduit to the machine or other equipment which member embraces an oil container so arranged therein that oil is drawn from said container into the stream of compressed air which is delivered to the machine or other equipment. The oil container has, in proportion to the outside member, a diameter such that the free cross-sectional area secured by spacers, corresponds to that of the compressed air supply conduit. The oil container discharges forward into an adjustable nozzle, suitably provided with a filter cone, so that the oil, which is forced out of the oil container through the nozzle by a piston moved under the force of the compressed air to a predetermined extent, is carried along by the injector action and is atomized. In order to prevent the machine or the other equipment from running without oil after the contents of the container have been used up, a safety device may be built into the apparatus to interrupt the stream of compressed air and so stop the endangered apparatus whenever there is insufficient oil in the container.

The invention will now be described with reference to the accompanying drawings, of which Figure 1 is a longitudinal section through an apparatus according to the present invention, Figure 2 is a horizontal section taken along the line A—B of Figure 1, Figure 3 is a horizontal section taken along the line C—D of Figure 1, Figure 4 is a horizontal section taken along the line E—F of Figure 1, Figure 5 is a horizontal section taken along the line G—H of Figure 1, Figure 6 is a horizontal section taken along the line J—K of Figure 1, Figure 7 is a longitudinal section through another embodiment of an apparatus according to the invention embodying a safety device, and Figure 8 is a horizontal section taken along the line L—M of Figure 7.

The apparatus shown in Figures 1 to 6 comprises a hollow cylinder 1, which narrows at one end into a neck 2, the latter being provided with a screw thread for attachment to a connecting piece, for instance, a bayonet lock 3. The other end of cylinder 1 also has a thread portion for screwing into an adapter member 4, on which is screwed a bayonet lock 5 for easy connection with a compressed air conduit. A container 6 filled with oil is inserted into the cylinder 1, is centered by spacers 7 and is secured by collars 8, 9. The oil container 6 terminates in a neck 10, into which a nozzle 11 is screwed so as to be controllable in the known manner in relation to the flow. In the container 6 a piston 12 is provided, which is fixed to a rod 14 guided in a screwed-on end plate 13. During operation, this piston 12 is struck on the rear side by the compressed air and pushed forward as the compressed air penetrates into the container through the annular clearance 15 between the piston rod 14 and the plate 13. Therefore, and dependent upon the dimension of the clearance 15, a more or less large quantity of oil is forced through the nozzle 11, which oil is then atomized by compressed air rushing past the nozzle and is conducted in this form to the lubrication points.

The filling of the oil container 6 takes place in a simple manner by, at least partly, unscrewing the nozzle, whereupon the oil can be drawn into the container 6 by immersing its end in the oil and by retracting the piston 12 by means of the piston rod 14. By examination of the position occupied by the piston rod 14, after loosening of the rear bayonet lock 5, it is readily ascertainable whether or not a refilling of the container 6 is required.

In order to be completely independent of the responsible servicing personnel, it is desirable to ensure that the compressed air is shut off at a determined position of the piston in the oil container.

For this purpose, as apparent from Figures 7 and 8, the bottle-shaped hollow cylinder 17 accommodating the oil container 16, has a releasable intermediate piece 18 at the rear end instead of the connecting piece of the previous embodiment. This intermediate piece 18 is formed as a kind of double nipple, each part of which has a thread 19 and 20 separated from each other in a suitable manner by a collar 21, so that the piece is adapted to close cylinder 17 and at the same time to release, e. g. by unscrewing, fasten thereto a hollow member 22, which suitably corresponds in shape and diameter approximately to the hollow cylinder 17. The intermediate piece 18 has a central bore 23 corresponding in size to the cross-sectional area of the compressed air supply conduit, and is funnel-shaped on side it presents to member 22. The piston rod 24 of the oil container 16 extends right through the central bore 23 and at the lowest position of piston 26 still projects by virtue of an extension 25 out of the connecting boss 27 of the hollow member 22 for the compressed air conduit. A valve 28 is mounted on the extension 25 of the piston rod 24 at such a distance from the piston 26 that it covers the central bore 23 as soon as the piston 26 reaches the bottom of the oil container 16, that is, as soon as it can no longer force oil out of the container. Consequently, the valve 28 shuts off the stream of compressed air so that the device stops operating; servicing personnel are forced to refill the apparatus with oil and no damage can result.

For refilling the second embodiment of the apparatus, a filler connection 29 is mounted in front of the oil container 16, see Figure 8; it has a recess for inserting a packing 30, against which the front face of a lock screw 31, arranged in the wall of the cylinder 17 can be tightly pressed. The bore 32 of screw 31 forms with the bore 33 of the filler connection 29 a continuous duct, which can be closed by a screw stopper 34. For taking up of the contact pressure of the screw 31, a lug 35 is fitted on the opposite side of the oil container which lug, together with further lugs 36, 37 distributed around the cylinder wall centers the oil container and by engagement against a collar 38 protects against forward displacement. The safety mechanism at the opposite end of the filler is associated with a filter 39 in which the connection 40 of the oil container engages and which is supported on the other side against the intermediate piece 18. In order to prevent damage to the projecting parts of this embodiment of the apparatus, they are disposed in a shaped housing 41, which is suitably streamlined.

It will be apparent to those skilled in the art that the novel principles of the invention disclosed herein in connection with specific exemplifications thereof will suggest various other modifications and applications of the same.

I wish it to be understood that I do not desire to be limited to the exact details of construction shown and described, for obvious modifications will occur to a person skilled in the art.

What I claim is:

1. In an apparatus for the lubrication of machines and similar equipment which is driven by compressed air a compressed air supply conduit, a hollow member narrowing at one end and built into the compressed air supply conduit, said hollow member embracing and oil container, the latter being so arranged that oil is drawn from said container into the stream of the compressed air which is delivered to the apparatus, said oil container being equipped with a piston which fits on a rod passing through a cover plate of the container, one face of said piston being subjected to the force of the compressed air from said supply conduit passing through the clearance between said rod and said plate, the hollow member embracing the oil container having a second hollow member attached thereto, an aperture in the front wall of which the second member is capable of being closed in the manner of a valve, depending upon the position of the piston in the oil container, said two hollow members being releasibly connected to each other by an intermediate piece comprising the front wall, which piece is constructed with a valve seat comprising the aperture which is capable of being closed by a valve fitting on an extension of the piston rod, 2. In an apparatus according to claim 1, the valve being mounted on the piston rod at such a distance from the piston that it closes the aperture between the two hollow members as soon as he piston reaches its foremost end position.

3. In an apparatus according to claim 2, a filter being located at the front end of the second hollow member, against which filter the oil container abuts so that it is ensured against backward displacement.

References Cited in the file of this patent

UNITED STATES PATENTS

| 562,876 | Wilson | June 30, 1896 |
| 1,621,771 | Egan | Mar. 22, 1927 |

FOREIGN PATENTS

| 612,222 | Germany | Apr. 16, 1935 |